(12) United States Patent
Barrett et al.

(10) Patent No.: US 11,695,574 B2
(45) Date of Patent: Jul. 4, 2023

(54) METHOD AND SYSTEM FOR ESTABLISHING TRUST FOR A CYBERSECURITY POSTURE OF A V2X ENTITY

(71) Applicant: BlackBerry Limited, Waterloo (CA)

(72) Inventors: Stephen John Barrett, Haywards Heath (GB); Nicholas James Russell, Newbury (GB); John Octavius Goyo, Acton (CA)

(73) Assignee: BlackBerry Limited, Waterloo (CA)

(*) Notice: Subject to any disclaimer, the term of this patent is extended or adjusted under 35 U.S.C. 154(b) by 183 days.

(21) Appl. No.: 16/861,991

(22) Filed: Apr. 29, 2020

(65) Prior Publication Data

US 2021/0344514 A1 Nov. 4, 2021

(51) Int. Cl.
*G06F 21/00* (2013.01)
*H04L 9/32* (2006.01)
*H04L 9/40* (2022.01)
*G06F 21/64* (2013.01)

(52) U.S. Cl.
CPC ............ *H04L 9/3268* (2013.01); *G06F 21/64* (2013.01); *H04L 9/3213* (2013.01); *H04L 63/1425* (2013.01)

(58) Field of Classification Search
CPC . H04L 9/3268; H04L 63/1425; H04L 9/3213; G06F 21/64
See application file for complete search history.

(56) References Cited

U.S. PATENT DOCUMENTS

| | | | |
|---|---|---|---|
| 9,805,601 | B1* | 10/2017 | Fields ................. B60T 17/22 |
| 2013/0117558 | A1* | 5/2013 | Metke ............... H04L 63/0823 713/156 |
| 2015/0019067 | A1* | 1/2015 | Chakravarty ........... G07C 5/008 701/31.5 |
| 2016/0373473 | A1* | 12/2016 | Truong ............... G08G 1/0104 |
| 2018/0288069 | A1* | 10/2018 | Burchard ............. H04L 9/3263 |
| 2018/0322785 | A1* | 11/2018 | Jerichow ............... G08G 1/162 |
| 2019/0297499 | A1* | 9/2019 | Hawkes ............ H04W 12/069 |
| 2019/0312896 | A1* | 10/2019 | Petit ...................... H04W 4/46 |
| 2019/0379683 | A1* | 12/2019 | Overby ............. H04L 63/1408 |
| 2020/0025575 | A1* | 1/2020 | Weissman ............ G01S 13/751 |

(Continued)

OTHER PUBLICATIONS

IEEE 1609.2, "EEE Standard for WAVE—Security Services for Applications and Management Messages—Consolidated Draft of IEEE 1609.2-2016 with Amendments Specified in 1609.2a / D8 and 1609.2b / D3" Dec. 2016.

(Continued)

*Primary Examiner* — Shewaye Gelagay
*Assistant Examiner* — Michael M Lee
(74) *Attorney, Agent, or Firm* — Moffat & Co

(57) ABSTRACT

A method at an Intelligent Transportation System (ITS) Transmitting Entity, the method including: generating an ITS message; augmenting the ITS message with an Integrity Report generated by an integrity detection function at the ITS Transmitting Entity to create an augmented ITS message; signing the augmented ITS message with an Authorization Certificate or Ticket, the Authorization Certificate or Ticket including an assurance indication from an Audit Certificate Authority for the integrity detection function; and sending the signed, augmented ITS message to an ITS Receiving Entity.

19 Claims, 10 Drawing Sheets

(56) References Cited

U.S. PATENT DOCUMENTS

| | | | |
|---|---|---|---|
| 2020/0045552 A1* | 2/2020 | Kim | H04L 9/3268 |
| 2020/0211368 A1* | 7/2020 | Ueno | G06Q 40/08 |
| 2020/0226274 A1* | 7/2020 | Juliato | G06F 21/62 |
| 2021/0227356 A1* | 7/2021 | Hwang | H04W 4/40 |
| 2021/0281986 A1* | 9/2021 | Zhu | H04L 63/00 |

OTHER PUBLICATIONS

ETSI Technical Specification (TS) 103 097 "TS; Security; Security header and certificate formats" v1.3.1, Oct. 2017.
ETSI Technical Specification (TS) 102 941 "ITS; Security; Trust and Privacy Management", v1.2.1, May 2018.
ETSI Technical Specification (TS) 102 904 "Intelligent Transport Systems (ITS) Security, ITS Communications Security Architecture and Security Management", v. 1.2.1, Nov. 2016.
ETSI Technical Specification (TS) 102 940 "Intelligent Transport Systems (ITS); Security; ITS communications security architecture and security management" v1.3.1, Apr. 2019.
CAR2CAR Communication Consortium, "Protection profile V2X Hardware security module", Aug. 2018.
IETF Network Endpoint Assessment, "Request for Comment (RFC) 5209 Network Endpoint Assessment (NEA): Overview and Requirements" Jun. 2008.
PRESERVE, "PREparing SEcuRe VEhicle-to-X Communication Systems Deliverable 5.4", Jan. 31, 2016.

\* cited by examiner

US 11,695,574 B2

METHOD AND SYSTEM FOR ESTABLISHING TRUST FOR A CYBERSECURITY POSTURE OF A V2X ENTITY

FIELD OF THE DISCLOSURE

The present disclosure relates to Vehicle to Everything (V2X) communications, and in particular relates to trust for V2X messages.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure, such as on bridges or at intersections, and for other users of the transportation systems including pedestrians or bicyclists.

ITS system deployment is receiving significant focus in many markets around the world, with radiofrequency bands being allocated for the communications. In addition to the vehicle to vehicle communications for safety critical and non-critical applications, further enhancements to provide for traffic safety and efficiency are being developed for vehicle to infrastructure and vehicle to portable scenarios.

However, when such devices communicate, a receiving device needs to be confident that the message received is trustworthy in order to act on the information within such message. One aspect of the problem that a receiving device faces in determining trustworthiness is whether the sending entity is cybersecure. In other words, the receiving entity needs to be confident that the sending entity has not been compromised or hacked. A compromised sending entity could be coerced into sending securely signed but illegitimate messages or data, which may be detrimental to the ITS system.

BRIEF DESCRIPTION OF THE DRAWINGS

The present disclosure will be better understood with reference to the drawings, in which.

DETAILED DESCRIPTION OF THE DRAWINGS

Figure 1:
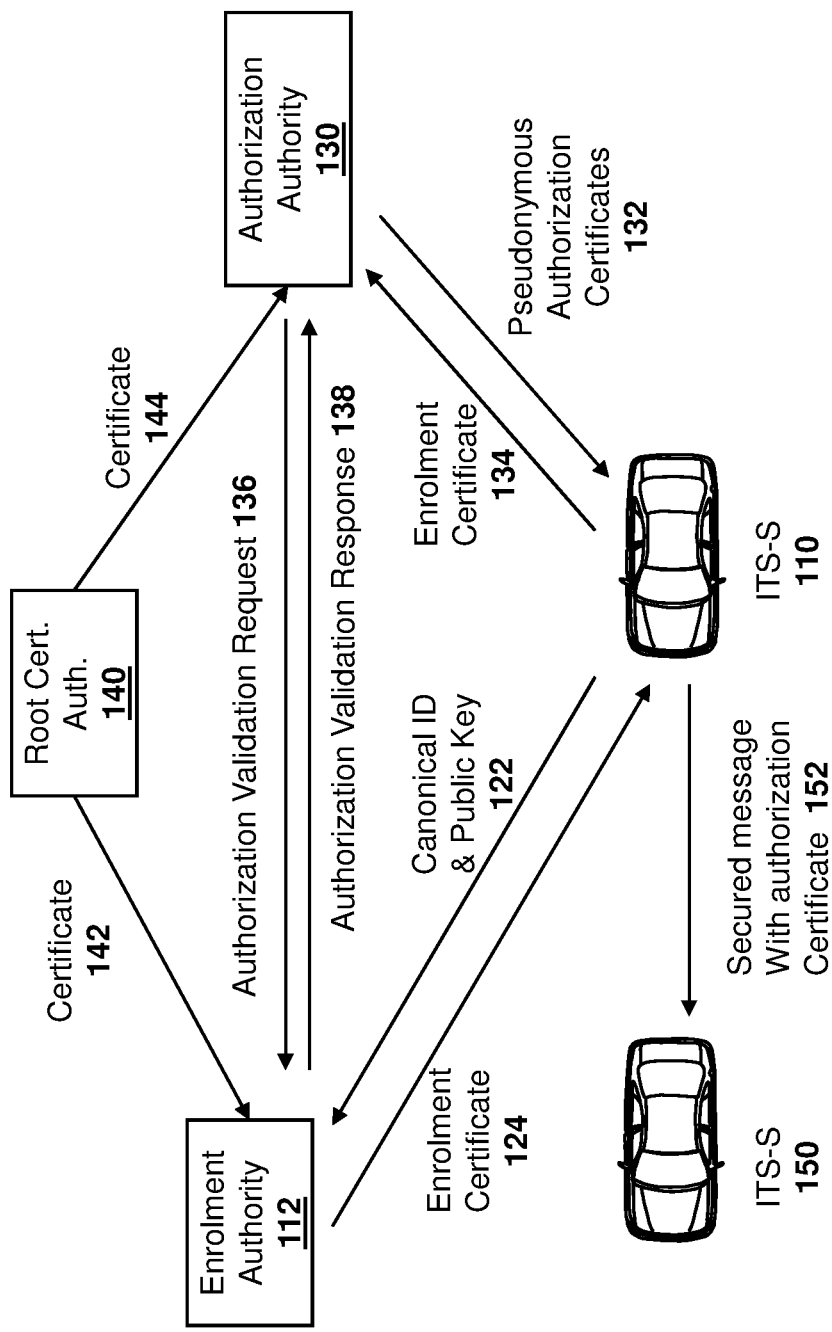
FIG. 1 is a block diagram showing an example public key infrastructure architecture for certificates in a V2X system.

The present disclosure provides a method at an Intelligent Transportation System (ITS) Transmitting Entity, the method comprising: generating an ITS message; augmenting the ITS message with an Integrity Report generated by an integrity detection function at the ITS Transmitting Entity to create an augmented ITS message; signing the augmented ITS message with an Authorization Certificate or Ticket, the Authorization Certificate or Ticket including an assurance indication from an Audit Certificate Authority for the integrity detection function; and sending the signed, augmented ITS message to an ITS Receiving Entity.

The present disclosure further provides an Intelligent Transportation System (ITS) Transmitting Entity, the ITS Transmitting Entity comprising: a processor; and a communications subsystem, wherein the ITS Transmitting Entity is configured to: generate an ITS message; augment the ITS message with an Integrity Report generated by an integrity detection function at the ITS Transmitting Entity to create an augmented ITS message; sign the augmented ITS message with an Authorization Certificate or Ticket, the Authorization Certificate or Ticket including an assurance indication from an Audit Certificate Authority for the integrity detection function; and send the signed, augmented ITS message to an ITS Receiving Entity.

The present disclosure further provides a computer readable medium for storing instruction code which, when executed by a processor of an Intelligent Transportation System (ITS) Transmitting Entity cause the ITS Transmitting Entity to: generate an ITS message; augment the ITS message with an Integrity Report generated by an integrity detection function at the ITS Transmitting Entity to create an augmented ITS message; sign the augmented ITS message with an Authorization Certificate or Ticket, the Authorization Certificate or Ticket including an assurance indication from an Audit Certificate Authority for the integrity detection function; and send the signed, augmented ITS message to an ITS Receiving Entity.

In determining whether to act on a received V2X message, a V2X entity or ITS-S (such as a vehicle) receiving that message may need to determine whether or not it can trust the message. This is especially important in safety critical use cases. For example, in cases such as Emergency Brake Warning, the receiving vehicle may need to determine whether or not it should act on the message contents and apply its brakes hard, possibly even in the absence of other corroborating information.

One aspect of the problem that the V2X receiver faces in determining trustworthiness is whether the V2X transmitting vehicle is cybersecure. If a V2X transmitter has been compromised or hacked by a malicious actor, then this could result in compromised or erroneous V2X message content. Where a V2X transmitter has been compromised, a malicious actor may generate, for example, false emergency brake warning messages with a view to increasing the likelihood of an accident.

Therefore, the present disclosure addresses the issue of how an ITS station (ITS-S) that receives a V2X message can determine whether it can trust the contents of the V2X message, and therefore act on, or otherwise utilize the information in the received V2X message. Specifically, one issue considered herein is how the ITS-S station that receives the V2X message establishes confidence that the V2X transmitter has not been compromised by a malicious actor. For example, the transmitter may be compromised through exploitation of cybersecurity vulnerabilities in some cases.

The present disclosure is related to V2X, which is a feature that provides for communication of information from a vehicle to other entities (and possibly also vice versa) that may affect the vehicle and/or the other entities. A V2X Entity is therefore an entity that supports one or both of sending V2X messages and receiving V2X messages, and can include Intelligent Transportation System (ITS) Stations (ITS-S), Electronic Control Units (ECUs), On-Board Units (OBUs), a User Equipment (UE), a Mobile Entity (ME), an End Entity (EE), among other options. A V2X Entity is also referred to as an ITS Entity or ITS-S herein, and the terms may be used interchangeably.

Communications to or from the vehicle may be to various V2X endpoints. A V2X endpoint may include: other vehicles, which alone may be referred to as Vehicle-to-Vehicle (V2V); infrastructure such as road-side units, which alone may be referred to as Vehicle-to-Infrastructure (V2I); pedestrians or cyclists, which alone may be referred to as Vehicle-to-Pedestrian (V2P); network(s), which alone may be referred to as Vehicle-to-Network (V2N); devices such as electronic devices within the vehicle, which alone may be referred to as Vehicle-to-Device (V2D); the electricity grid, which alone may be referred to as Vehicle-to-Grid (V2G); among other options. Together these are referred to as V2X.

V2X communications can be used for a variety of uses. In some cases, V2X may be used for both road safety and for improving efficiency of road transport, such as by reducing congestion or reducing fuel consumption.

Various systems/architectures can provide V2X communication. Cellular networks, such as those defined in the Third Generation Partnership Project (3GPP) set of specifications, is one such system/architecture. Other systems/architectures could include, for example, an Integrated Digital Enhanced Network (iDEN), the Institute of Electrical and Electronic Engineers (IEEE) 802.11p based wireless networks, among other options.

Generally, V2X communications consist of V2X messages sent from and received by V2X Entities. To protect V2X messages and the V2X system as a whole against rogue V2X Entities sending rogue messages, all V2X messages are integrity protected. Such integrity protection is realized by V2X Endpoints signing V2X messages before sending/broadcasting and including a certificate (also known as an Authorization Ticket) for the receiving V2X Endpoint to use to verify the signature. Thus, a V2X message consists of the data to be communicated, a signature of the data to be communicated, and a certificate.

The certificate contains data to verify that the signature is authentic, as well as other data. The data to verify that the signature is authentic may, for example, consist of a verification key, public key, or other such data. The signature included may follow the format defined in subclause 2.2.1 of IEEE 1609.2, *"IEEE Standard for WAVE—Security Services for Applications and Management Messages—Consolidated Draft of IEEE 1609.2-2016 with Amendments Specified in 1609.2a/D8 and 1609.2b/D3"*, December 2016.

A V2X Entity can obtain certificates to use in a V2X system by performing an enrolment, such as with an Enrolment Authority, followed by an authorization, for example with an Authorization Authority.

Reference is now made to FIG. 1, which provides an example overview of a European Telecommunications Standards Institute (ETSI) ITS Public Key Infrastructure, as for example defined in ETSI Technical Standard (TS) 102 904, *"Intelligent Transport Systems (ITS) Security, ITS Communications Security Architecture and Security Management"*, v. 1.2.1, November 2016.

In the example of FIG. 1, at the time of manufacture, a canonical identifier (ID), which is a an ID unique to each V2X Entity in a V2X system, is provided to the V2X Entity (e.g. ITS-S 110), and the same canonical ID is provided to the Enrollment Authority 112 alongside other information that is relevant to that canonical ID, such as an assurance level. This is for example described in ETSI TS 103 097 *"ITS; Security; Security Header and Certificate Formats"*, v1.3.1, October 2017 and in ETSI TS 102 941 *"ITS; Security; Trust and Privacy Management"*, v1.2.1, May 2018.

In the ITS architecture, an Enrolment Authority 112 authenticates an ITS-S 110 once it receives the Canonical ID and possibly other data (for example, a Public Key) 122 and grants it authorization to engage in ITS communications by issuing an Enrolment Certificate 124 (which may also be referred to herein as an Enrolment ID or Enrolment Credential). An Authorization Authority 130 provides an ITS-S 110 with authorization to use specific ITS services by providing temporary/pseudonym certificates 132 (known also as Authorization Tickets or Authorization Certificates) that can be used for these services. This authorization is based on the Enrolment Certificate 134, which is validated by the Enrolment Authority 112 using an Authorization Validation Request 136 and Authorization Validation Response 138. For example, ETSI TS 102 941 *"ITS; Security; Trust and Privacy Management"*, v.1.2.1, May 2018, describes Authorization Validation Request and Response messages. In particular, an Authorization ValidationRequest message can include data such as a signed external payload and a shared attribute request. Such data may be signed and encrypted.

An AuthorizationValidationResponse message may include the authorization validation response itself, which may be both signed and encrypted.

A Root Certificate Authority 140 may provide certificates 142 to Enrolment Authority 112 and certificates 144 to Authorization Authority 130.

ITS-S 110 may then communicate with other V2X endpoints, such as ITS-S 150, using messages secured with the authorization certificate 152.

Figure 2:
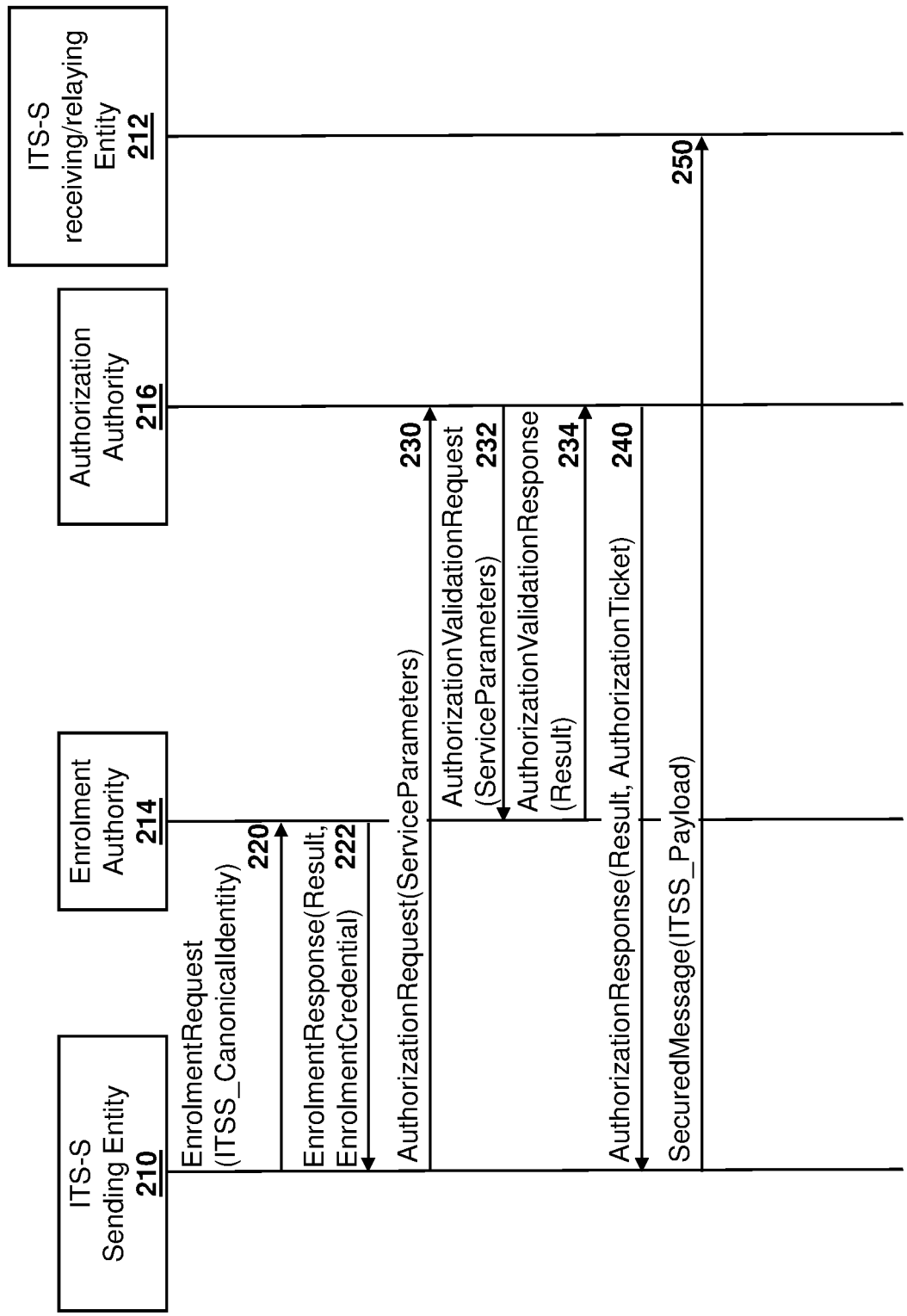
FIG. 2 is a dataflow diagram showing a certificate retrieval process in a V2X architecture.

An example for the messaging for the certificates is described with regards to FIG. 2. In the embodiment of FIG. 2, an ITS-S Sending Entity 210 wants to communicate with an ITS-S Receiving or Relaying Entity 212. First however, an enrolment credential must be received from an Enrolment Authority 214 and authorization ticket received from an Authorization Authority 216.

In this regard, the ITS-S Sending Entity 210 sends an EnrolmentRequest message 220 to the Enrolment Authority 214 and includes its Canonical ID and public key.

The Enrolment Authority 214 responds to the ITS-S Sending Entity 210 with an EnrolmentResponse message 222 and includes a result and enrolment credential.

The ITS-S Sending Entity 210 then requests certificates/Authorization tickets by sending an Authorization Request message 230 to the Authorization Authority 216. Message 230 includes service parameters.

The Authorization Authority 216 sends an Authorization-Validation Request message 232 including the service parameters to the Enrollment Authority 214. The Enrolment Authority 214 responds to the Authorization Authority 216 with an AuthorizationValidationResponse message 234 with a result. Message 234 may further include an Assurance Level that applies. The Authorization Authority 216 may include the Assurance Level, if received, in the Authorization Tickets (also known as Authorization Certificates or Pseudonym Certificates) that it produces. As used herein, Authorization Tickets could include the European Authorization Tickets or US Authorization Certificates, previously known as Pseudonym certificates.

These Authorization Tickets are provided by the Authorization Authority 216 to the ITS-S Sending Entity 210 in the Authorization Response message 240.

The ITS-S Sending Entity 210 can then send a V2X message, shown as SecuredMessage 250, to another ITS-S in the Intelligent Transportation System, such as ITS-S Receiving or Relaying Entity 212. The ITS-S Sending Entity 210, when wishing to send a V2X message, typically creates a V2X message that includes a certificate (Authorization Ticket) and a payload (e.g. vehicle current position, speed); computes a fixed length hash of the variable length V2X message, using a well-known hashing algorithm; signs the hash, using the ITS-S Sending Entity's private key; and appends the signature to the payload and sends the resulting V2X message.

Thus, the V2X message contains the message contents, a signed hash of the message, and a certificate. The message contents may, in accordance with ETSI TS 102 940, be protected for authenticity and integrity, and confidentiality and privacy. Therefore, the payload may but need not be encrypted.

The authorization ticket/certificate may include, amongst other things, the sending entity's pseudonymous identity; a signature block which is a hash of the sending entity's identity and the sending entity's public key that is signed by the Certificate Authority using the Certificate Authority's private key; the identity of the certificate authority which has signed the certificate; and an assurance level of the sending V2X Entity.

On receiving message 250, the ITS-S Receiving or Relaying Entity 212 will typically apply the Certificate Authority's well-known public key to the certificate's signature block to verify the identity of the sending entity and the public key of the sending entity.

The ITS-S Receiving or Relaying Entity 212 may then check that the identity is not on a list of identities (pointed to) in a Certificate Revocation List (CRL). If the sending entity's identity is on the CRL then the message may be discarded. The ITS-S Receiving or Relaying Entity 212 may perform other plausibility (non-cryptographic) checks and validity (cryptographic) checks.

The ITS-S Receiving or Relaying Entity 212 may then use the public key of the sending entity to verify the signature included in the V2X message.

As indicated above, the ITS-S Receiving or Relaying Entity 212 may check that the identity is not on the list of identities pointed to in a Certificate Revocation List (CRL). Receiving entities are typically configured with information to verify certificates such as root certificates. However, certificates can be revoked at any time, for example due to the receipt of a Misbehavior Report at a Misbehavior Authority.

Therefore, receiving entities may need to be able to detect or be configured with data that identifies revoked certificates such as a Certificate Revocation List (CRL). A CRL, in its basic form, is a list of digital certificates or indications of digital certificates, including hashes or "linkage seeds" in some cases, whom the Certificate Authority (CA) has decided to revoke before their expiration date/time. A CRL is produced by a Certificate Authority (which may also be a Misbehavior Authority) for the certificates under the CA's authority. These are distributed to, or fetched by, V2X Entities that need to handle certificates issued by that CA. CRLs are typically signed in order to provide integrity and authenticity of their content.

Entities receiving certificates check whether the received certificate is indicated in the CRL obtained from the certificate's Certificate Revocation Authority CA (CRACA) (each certificate contains an indication of its CRACA e.g. CracaID) as being revoked, and if so, should consider them and the data they are associated with, such as payload data in a V2X message, as untrustworthy.

Only unexpired certificates are typically present on a CRL. In other words, once a certificate has expired, it no longer needs to be present on the CRL because entities receiving expired certificates will already treat such certificates as revoked.

CRLs can be distributed to an entity that needs them at any time, such as before the entity is expecting to start receiving certificates. However, the entity may need to fetch/obtain a new CRL when receiving a certificate that has a CRACA that identifies a CRL for which the entity has no CRL or has a CRACA that identifies a CRL that has already been obtained and that has either expired or has a "Next Update" field that has a value that occurs in the past.

While the above describes receiving V2X messages that are validated by a certificate, in some cases a Cybersecurity Assurance Level needs to also be conveyed. Various solutions for providing a Cybersecurity Assurance level are, for example, described in IEEE 1609.2; ETSI, the Internet Engineering Task Force (IETF) and the Car2Car consortium.

Specifically, the process defined in IEEE 1609.2 of obtaining an Enrolment certificate and then Application certificates (similar to "Authorization Tickets" and previously known as "pseudonym certs") is similar to that described in ETSI TS 103 097. An "assuranceLevel" item can be included in the IEEE 1609.2 certificate that is sent with the V2X message, where that certificate's corresponding private key is used to sign the V2X message.

For example, IEEE 1609.2 defines a ToBeSignedCertificate as including various fields such as the Id, cracaID, region, and assuranceLevel, among other fields. The assuranceLevel has a value defined as SubjectAssurance and is optional.

In ETSI TS 102 941, the process described above with regards to FIG. 2 applies. The Assurance Level attribute is a type of "Subject Assurance" as defined in IEEE 1609.2 and reused in ETSI-ITS. As described with regards to FIG. 2, a certificate or hash thereof is included with every V2X message that an ITS-S sends, and consequently the assurance level is also sent.

IETF, in a document entitled draft-tls-certieee1609-02.txt, "Transport Layer Security (TLS) Authentication using ITS ETSI and IEEE certificates", March 2018, considered a Trust Assurance Level (mandatory). Specifically, this draft stated: Trust Assurance Level (TAL): The C-ITS certificates of CAs and end-entities must contain a TAL: (1) For the security of a V2X communication system, assurance about the in-vehicle security of participants is vital: the receiver of a message has to be able to rely on the fact that the sender has generated the message correctly (i.e. the car sensors information is accurate and of integrity). Hence, a security breach on the sender would have an impact on all the receivers of a message; and (2) Only vehicles with a reasonable "level of security" should be able to obtain certificates from the PKI. The Car-to-Car Communication Consortium (C2C-CC) introduced different levels of trust, defined as Trust Assurance Levels and the authorization tickets (i.e. pseudonym certificates) of the vehicle must include the value of the vehicle TAL. Subsequent drafts do not contain this requirement.

The Car2Car consortium defines an Evaluation Assurance Level (EAL4) Common Criteria protection profile for the V2X Hardware Security Module (HSM) in Car2Car communication consortium, "Protection profile V2X Hardware security module", August 2018. Section 7.4.6 of the Car2Car consortium Basic Profile, "C2C-CC Basic System profile", August 2016, describes trust assurance for Car to Everything (C2X) stations. Highlights include that 5 trust levels are specified as Trust Assurance Level (TAL) 0 through TAL 4, where TAL 4 is highest Trust Assurance Level. A Minimal acceptable TAL for an ITS station is TAL 2. Each TAL is mapped to a Subject Assurance representation according to ETSI TS 103 097.

Further, a 2012 presentation at a Car2Car consortium/CAMP meeting had the following highlights: a receiver can be sure that the V2X message is not faulty based on the notion that a trusted party has evaluated the sending endpoint according to a well proven internationally accepted and trusted security standard and issues a certificate the receiver can verify about its opinion on how difficult it is to compromise this sender. The meeting further suggested that different TALs could be used for different applications, since if there is just one TAL level, it would have to be the one required by the most demanding application. This level may be a difficult level to achieve level for all applications.

The Car2Car meeting considered options for a 'trusted international standard', including NIST FIPS-140-X, which dealt more with use of cryptography rather than a full-blown cybersecurity standard; ISO Common Criteria 3.1, which has limited durability (2 years), causing a problem and also being costly; and the CC adapted custom OEM C2X evaluation scheme. Also, the ISO/SAE 21434 Draft International Standard "*Road vehicles—Cybersecurity engineering*", February 2020, did not exist in 2012, but is described below.

An example of Trust Assurance Levels as defined by the C2C forum is shown in Table 1 below.

TABLE 1

Trust Assurance Levels for C2X Stations

| Trust ass. level TAL | Minimum Target of Evaluation (TOE) | Minimum Evaluation Assurance Level (EAL) | (Hardware) Security Functionality | Prevented Attacker acc. To CC | Security Implications | C2X use Case Examples |
|---|---|---|---|---|---|---|
| 0 | None | None | None | None | Not reliable against security attacks in general | Some limited e.g. using trusted C2I infrastructure |
| 1 | +C2X box software | EAL 3 | Only software security mechanisms | Basic | Not reliable against simple hardware attacks (e.g. offline flash manipulation) | Non-safety, but most privacy relevant use cases |
| 2 | +C2X box (sec.) hardware | EAL 4 | +Dedicated hardware security (i.e. secure memory & processing); tamper evidence | Enhanced Basic | Not reliable against more sophisticated hardware attacks (e.g. side-channel attacks) | C2C-CC day one use cases (e.g. passive warnings and helpers) |
| 3 | +tamper-protected (sec.) hardware | EAL 4+ (AVA_VAN.4 vulnerability resistance) | +Basic tamper resistance | Moderate | C2X box secure as stand-alone device, but without trustworthy in-vehicle inputs | Safety relevant relying not only on V2X inputs |
| 4 | +relevant in-vehicle sensors and ECUs | EAL 4+ (AVA_VAN.5 vulnerability resistance) | +moderate-high tamper resistance | Moderate-High | C2X box is trustworthy also regarding all relevant in-vehicle inputs. | All |

In Table 1 above, TAL 2 is the minimum acceptable level.

Another example of an assurance level is with regard to PRESERVE. PRESERVE is a European Community funded project on security and privacy aspects of vehicle to everything communications. Highlights from Section 2.5 of 'PRESERVE' (7th framework program funded by the EC-DG INFSO), January 2016, '*Preparing Secure Vehicle to X communication systems*', Deliverable 5.4, Deployment Issues report, includes that: only vehicles with a reasonable level of security should be able to receive certificates from the C2X PKI; an entity (e.g. certification type company/industry consortium/self-signing by OEM) should be able to verify that a V2X module has met a minimum-security level; successful evaluation and certification could be the basis for an Enrollment Authority to issue enrollment credentials to vehicles; and TALs should be included in the authorization tickets (pseudonym certs) of vehicles.

In a further example, the ISO/SAE 21434 draft international standard (DIS) provides for Cybersecurity Assurance Levels (CALs) as defined in Table 2 below.

TABLE 2

ISO/SAE 21434 Cybersecurity Assurance Levels

| Level | Description | Philosophy | Difference from Previous Level |
|---|---|---|---|
| CAL 1 | Developers or users require a low to moderate level of independently assured cybersecurity. | Functionally and structurally tested. | Requiring developer testing, and a vulnerability analysis. |
| CAL 2 | Developers or users require a moderate level of independently assured cybersecurity and require a thorough investigation of the item without substantial reengineering. | Methodically tested and checked. It provides assurance through the use of development environment controls. | Procedures that provide moderate confidence that the item will not be tampered with during development. |
| CAL 3 | Developers or users require a moderate to high level of independently assured cybersecurity in conventional commodity items and are prepared to incur additional security-specific engineering costs. | Methodically designed, tested, and reviewed (resistance to penetration attackers with an enhanced-basic attack potential). | Requiring more design description, the implementation representation for the security functions, and improved mechanisms and/or procedures that provide confidence that the item will not be tampered with during development. |
| CAL 4 | Developers or users require the highest-level rigor. | Advanced methodically designed, tested, and reviewed. | Independent tested and reviewed (for example add an independent vulnerability analysis). |

Misbehavior Detection

Figure 3:
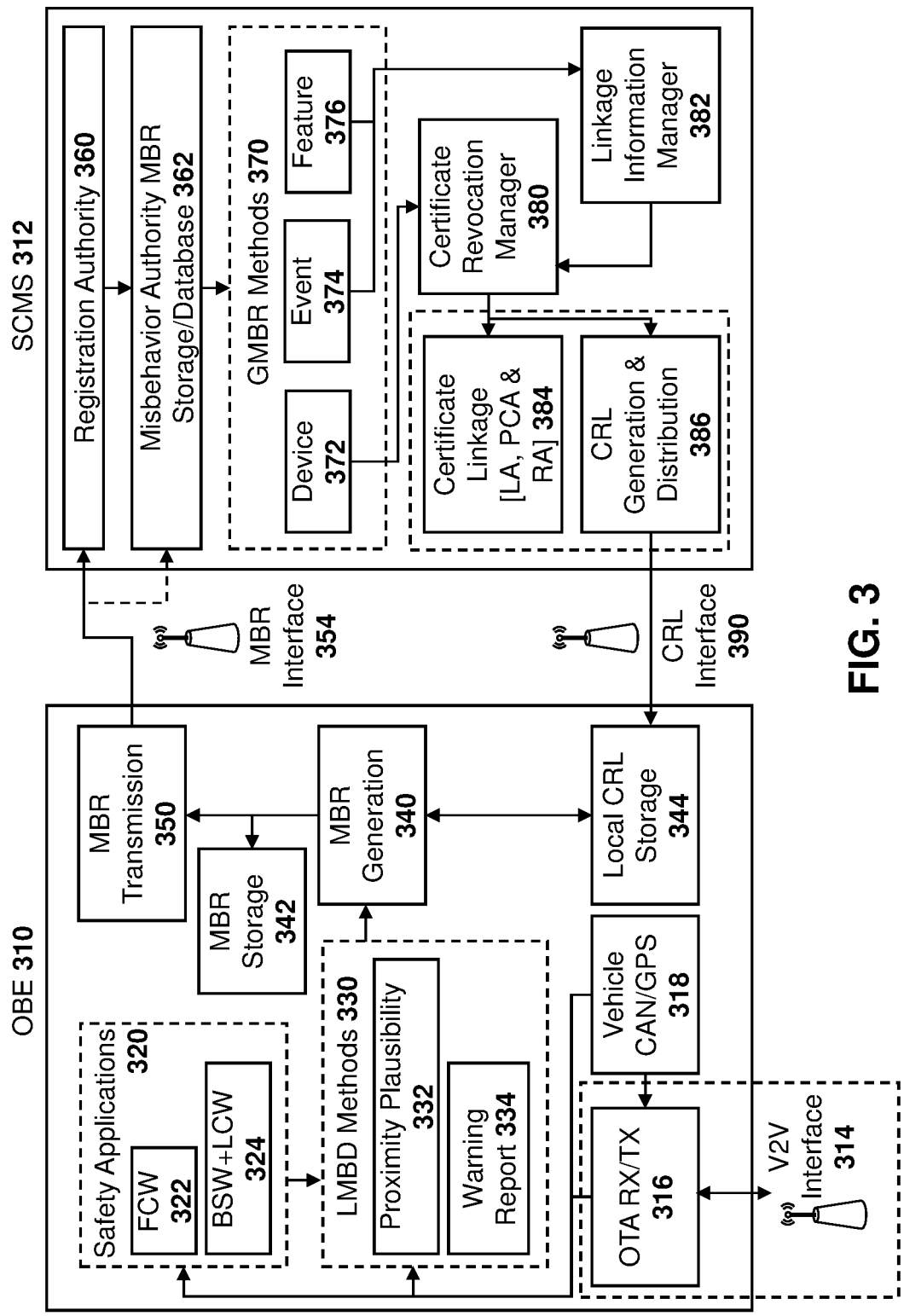
FIG. 3 is a block diagram showing a conceptual On Board Equipment (OBE) and Security Credential Management System (SCMS) Misbehavior Detection (MBD) architecture.

One example of global misbehavior detection is described in 'Vehicle to Vehicle Communications Misbehaviour Detection', CAMP, V2V-CR Final Report. In particular, the CAMP Vehicle Safety Communications 6 (VSC6) Consortium provides one example of a conceptual On Board Equipment (OBE) and Security Credential Management System (SCMS) Misbehavior Detection (MBD) component structure. Reference is now made to FIG. 3.

In the embodiment of FIG. 3, the left side of the figure shows information flow within OBE 310. The right side of the figure shows SCMS 312. Communication with other vehicles is facilitated through a V2V interface 314.

Within OBE 310, an Over-the-Air (OTA) receive (RX) and transmit (TX) function is shown at block 316 and communicates with the V2V interface 314. Vehicle Controller Area Network (CAN) and Global Positioning System (GPS) information is provided from block 318 to OTA RX/TX function block 316.

Further, information from both blocks 316 and 318 can be provided to Safety Applications block 320 and to Local Misbehavior Detection (LMBD) block 330.

Safety Applications block 320 and supporting processes consist of the Target Classification (TC), Threat Arbitration (TA) and the Safety Applications used for Warning Report generation. These include Forward Collision Warnings (FCW) block 322 and Blind Spot Warning/Lane Change Warning (BSW/LCW) block 324.

Local Misbehavior Detection (LMBD) Methods block 330 may generate reports including a Proximity Plausibility report at block 332 and a Warning Report at block 334. LMBD Methods block 330 receives input from blocks 316, 318 and 320, and may provide an output to Misbehavior Report (MBR) Generation block 340.

MBR Generation block 340 generates the misbehavior report and may provide it to MBR Storage block 342, Local Certificate Revocation List (CRL) Storage block 344 and MBR Transmission block 350.

MBR Transmission block 350 may use an MBR interface 354 to communicate with SCMS 312. In particular, communication may be with Registration Authority 360 and/or optionally with MBR Storage/Database 362.

Registration Authority 360 and/or MBR Storage/Database 362 provide input to Global Misbehavior Detection (GMBD) Methods block 370. GMBD Methods block 370 analyzes the MBRs received from the OBEs/vehicles and processes the MBRs to identify misbehavior and determine which device(s), if any, is the root cause of the misbehavior. GMBD block 370 includes a Device block 372, Event block 374, and Feature block 376.

Device block 372 provides a detection method which scans the database of received MBRs to count the number of MBRs reporting the exact same offending linkage value. If any linkage value totals more than the revocation threshold, the linkage value is submitted for revocation using Certificate Revocation Manager 380.

Event block 374 provides event-based detection, which is designed to catch misbehavior and attacks that take place in the same physical location and during a time window (e.g., minutes, hours, days), even if the misbehaving device(s) uses multiple pseudonym certificates for the misbehavior.

Feature block 376 provides feature-based detection, which is designed to catch advanced attacks and misbehaviors. This block is best thought of as a framework on which many detection algorithms can be built.

Event block 374 and Feature block 376 can provide an input to a Linkage Information Manager 382, which may then provide its output to Certificate Revocation Manager 380.

Certificate Revocation Manager 380 may provide information to a Certificate Linkage block 384, which may include a Linkage Authority (LA), Pseudonym Certificate Authority (PCA) and/or Registration Authority (RA).

Further, Certificate Revocation Manager 380 may provide information to a CRL Generation and Distribution block 386. Block 386 may be used, over a CRL Interface 390, to provide a CRL to OBE 310, and in particular to the Local CRL Storage block 344.

Therefore, in the structure of FIG. 3, the left side of the figure shows information flow within the OBE 310, which typically resides on a vehicle. This is the basis of the MBD as it feeds information to perform GMBD. Typically, the LMBD Methods 380, which can take input from the vehicle CAN and GPS receiver 318, as well as other sources such as safety applications and received V2X messages (e.g. BSMs received OTA from surrounding vehicles), provides the basis for the generation of the MBR that is sent via the MB Interface 354 to the Misbehavior Authority (MA) that resides on the SCMS.

The right side of FIG. 3 shows the information flow within the SCMS. Typically, the GMBD Methods 370, take input from the MBR received from the OBE (which typically reside on vehicles) via the MBR Interface 354 and perform an aggregate analysis, which provides the basis for placing an OBE or vehicle on the CRL. The CRL is then sent to one or more OBEs within the V2X system, which completes the end-to-end MBD and Revocation process.

Furthermore, solutions exist within in the V2X industry for endpoint anomaly detection, which may include sending data to a network entity for the network entity to determine anomalies in the endpoint. Example anomaly solutions include those provided by Internet Engineering Task Force (IETF) Network Endpoint Assessment (NEA), among others.

One network entity may be referred to as an Anomaly Detection Server. An anomaly that is detected by such server to exist in an endpoint may imply that the endpoint has been hacked or compromised. In other words, the cybersecurity posture of the endpoint is low or is broken or has been adversely affected. Such a situation may occur, for example, due to a vulnerability in the endpoint being exploited by an attacker.

The endpoint may be assessed, for example, in accordance with IETF Network Endpoint Assessment, Request for Comment (RFC) 5209, *"Network Endpoint Assessment (NEA): Overview and Requirements"*. Specifically, the IETF has defined a system architecture and suite of protocols for Network Endpoint Assessment principally directed at enabling enterprise IT infrastructure to assess the cybersecurity posture of an endpoint that wishes to join the enterprise network, for purposes of network access control. In this case, the endpoint could be a laptop, a desktop computer, among other options. For example, such an endpoint might be quarantined until it has had its cybersecurity posture determined to be satisfactory. One example from IETF RFC 5209 is as follows:

NEA provides owners of networks (e.g., an enterprise offering remote access) a mechanism to evaluate the posture of a system. This may take place during the request for network access and/or subsequently at any time while connected to the network. The learned posture information can then be applied to a variety of compliance-oriented decisions. The posture information is frequently useful for detecting systems that are lacking or have out-of-date security protection mechanisms such as: anti-virus and host-based firewall software.

. . . the intent of NEA is to assess these endpoints to determine their compliance with security policies so that corrective measures can be provided before they are exposed to those threats. For example, if a system is determined to be out of compliance because it is lacking proper defensive mechanisms such as host-based firewalls, anti-virus software, or the absence of critical security patches, the NEA protocols provide a mechanism to detect this fact and indicate appropriate remediation actions to be taken . . . .

NEA typically involves the use of special client software running on the requesting endpoint that observes and reports on the configuration of the system to the network infrastructure. The infrastructure has corresponding validation software that is capable of comparing the endpoint's configuration information with network compliance policies and providing the result to appropriate authorization entities that make decisions about network and application access . . . .

. . . Architectures, similar to NEA, have existed in the industry for some time and are present in shipping products, but do not offer adequate interoperability. Some examples of such architectures include: Trusted Computing Group's Trusted Network Connect [TNC], Microsoft's Network Access Protection [NAP], and Cisco's Cisco Network Admission Control [CNAC]. These technologies assess the software and/or hardware configuration of endpoint devices for the purposes of monitoring or enforcing compliance to an organization's policy.

Other solutions in this technical field may also exist, and may be referred to as "endpoint attestation".

Anomalies may be detected in a variety of ways. Examples of approaches for detecting anomalous behavior in IT equipment, that could be indicative of a security compromise, may include, but are not limited to the following.

In a first aspect, anomalies may be found through detection of security policy violations. This may include finding which processes can attach to which inter-process communication channel(s). It may further include processing ability restrictions, such as the ability to map physical memory ranges, switch Unique Identifiers (UIDs), create, unlock, among other abilities.

In a further aspect, anomalies may be found through detection of memory violations. This may include detecting stack cookies being overwritten; attempts to run code from non-executable memory; attempts to write to read-only data; heap hardening boundary protections; access to invalid memory pages; among other options.

In a further aspect, anomalies may be found through detection of networking anomalies. This may include detecting anomalous throughput rates on given network resources or detecting violation of networking policies, among other options. The networking policies may include policies for which an endpoint is allowed or prohibited to communicate with which other endpoints. Violation of networking policies may also be related to detection of a packet at a firewall, for example a packet that is denied through the firewall and is dropped.

In a further aspect, anomalies may be found through detection of process anomalies. This may include detecting unexpected processes running; expected processes not running; and/or processes not running at an expected privilege level; among other options.

In a further aspect, anomalies may be found based on task manager anomalies. In particular, such anomalies may include processes that are not consuming an expected level of processing power.

In a further aspect, anomalies may be found from crash detection, that is processes that have ended or terminated unexpectedly or prematurely. In particular, crashed processes could be indicative of a compromise.

In a further aspect, anomalies may be found based on an integrity check. For example, such integrity check may include cross-checking signatures and hashes of executables and other critical files, including one or more of: hardware; software; boot Read Only Memory (ROM); Operating System (OS); and application, among other options.

In a further aspect, anomalies may be found through detection of Hardware Security Module (HSM) tampering.

Other aspects for finding anomalies are also possible.

Misbehavior Detection in the V2X Transmitter

In accordance with the embodiments of the present disclosure, a receiving entity receiving a V2X message may need to determine whether it can trust the contents of the V2X message, and therefore act on, or otherwise utilize the information in the received V2X message. Specifically, the ITS-S that receives the V2X message may need to establish confidence that the V2X transmitter has not been compromised by a malicious actor, as may potentially occur through exploitation of cybersecurity vulnerabilities.

The examples provided herein are described in terms of the European Cooperative Credential Management System (CCMS) solution. However, similar concepts could equally be applied to any other types of SCMS, including but not limited to the US Crash Avoidance Metrics Partners (CAMP) based Security Credential Management System (SCMS) system, the Chinese SCMS system, among others.

As used herein, the term "Auditing CA" may be any company that might perform a cybersecurity assessment of the V2X design, manufacture and post production processes from an Original Equipment Manufacturer (OEM) or Tier 1 supplier. Such assessment may involve the Auditing Certificate Authority (CA) inspecting supplied documentation and evidence and interviewing employees in the company that designed, manufactured and/or is operating the V2X transmitter. In some cases in the present disclosure, the Auditing CA does not need to operate its own Public Key Infrastructure (PKI).

Figure 4:
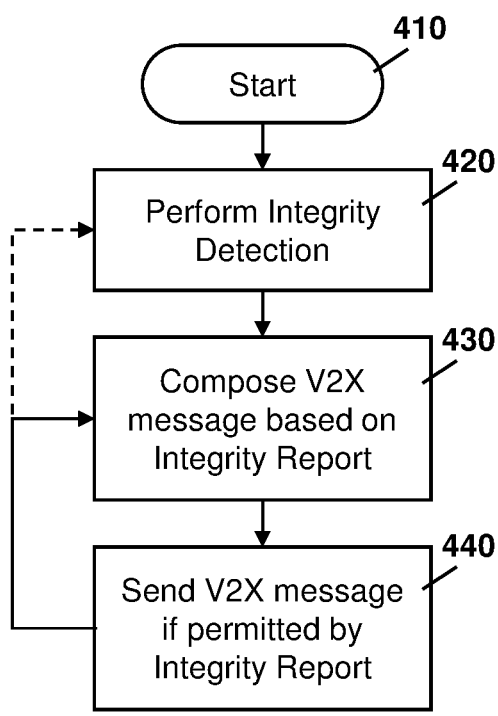
FIG. 4 is a process diagram for creating a V2X message based on an Integrity Report.

A high-level overview of one embodiment of the present disclosure is provided with regards to FIG. 4. In the environment of FIG. 4, the V2X transmitter has the capability to detect misbehavior. This may be based on a secure hardware component of the transmitter monitoring the V2X system in some cases.

The process of FIG. 4 starts at block 410 and proceeds to block 420 in which integrity detection may occur. In particular, misbehavior or anomalous behavior is detected in the V2X transmitter, rather than in third party entities that are external to the V2X transmitter. Such detection of integrity may occur utilizing an integrity detection engine. One example of such integrity detection engine is for example the BlackBerry Integrity Detection Engine, as described in an article by James Dreher entitled "*BlackBerry Integrity Detection is here!*", May 19, 2016.

Integrity detection, as used herein, is a broad term used to refer to checks on the cybersecurity posture of the transmitter, including but not limited to checking whether any anomalies have been detected, and whether the integrity of software, memory and other system components is deemed good or acceptable.

Therefore, a function within the V2X transmitter, such as an application running in secure hardware, as part of the Integrity Detection procedure or process produces an Integrity Report, which may contain information associated with anomalous behavior of the V2X transmitter. Information associated with the anomalous behavior of the V2X transmitter could be information or data related to various anomaly detection processes as provided above.

As used herein, "secure hardware" is comprised of hardware that is isolated, typically in a secure manner, from an area of the operating environment (in which the V2X application runs), which may be referred to herein as a "rich operating environment". Typically, this area is more constrained in terms of processing capability and is used to support security related features. For example, 'Secure hardware' could be any of: a trusted execution environment (sometimes known as a TEE); a Secure Element; Advanced Reduced Instruction Set Computer (RISC) Machine (ARM) TrustZone like feature; secure enclave, or other similar solutions.

The integrity detection being performed at block 420 may be based on a trigger occurring. For example, the trigger may include one or more of: device or OS boot up or start up; whenever an application is booted or loaded or started; periodically, for example based on a timer; upon firmware or software update completion, upon how the update was received for example whether such update was received over the air or performed directly; upon detection of new hardware; upon detection of a new or updated application; and/or whenever a V2X message is to be sent; among other options.

Once integrity detection has occurred and an Integrity Report has been generated, the process proceeds from block 420 to block 430 in which the V2X transmitter may compose a V2X message based on the Integrity Report. In particular, the outcome from block 420 affects what is included in a V2X message that is to be sent and whether the V2X message is to be sent at all.

For example, when building or constructing a V2X message, the V2X transmitter could include an Integrity Report which indicates that the V2X transmitter is currently considered to be cybersecure. In other words, the V2X transmitter may be considered to have no anomalies that have been detected and potentially that its software is up to date as of a particular date. The Integrity Report and the V2X message itself are signed, which may, for example, be performed within secure hardware that resides within the V2X transmitter.

Therefore, various options exist for a V2X message based on the Integrity Report. In a first option, the integrity report may be included in the V2X message sent to a V2X receiver when no compromise or anomaly has been detected. If a compromise or anomaly has been detected, then the V2X transmitter may choose not to send a V2X message and may also choose to indicate the decision to not send the V2X message to another entity, including one or more of: sending a message to an application (for example via an API), sending a message to an OBU or ECU (for example via a CAN bus), sending a message to a server outside the vehicle (for example an anomaly detection server or a cloud-based server), causing a visual alert on a display unit (for example a dashboard or infotainment system), causing an audible alert, among other options. The message sent to the application, the OBU or ECU, and the server outside the vehicle may contain the Integrity Report and may contain an indication indicating a compromise or anomaly has been detected.

In a second option, the Integrity Report may be included in a V2X message sent to a V2X receiver, irrespective of whether or not a compromise or anomaly has been detected. In some cases, such message may be sent irrespective of the degree of anomaly detected as well.

In still further cases, the Integrity Report may be included in certain V2X messages and excluded from other V2X messages. For example, the Integrity Report may be included only in safety critical V2X messages in some cases, such as an Emergency Brake Warning message, but excluded from common or periodic Cooperative Awareness Message (CAM) or Basic Safety Message (BSM) transmissions.

The contents of the Integrity Report could take a number of forms. For example, in a first case, the Integrity Report could provide an indication of "no compromise detected" or "compromise detected".

In a further case, the form of the Integrity Report could provide an indication of "no compromise detected", "anomaly detected but unclear whether compromised", or "compromise detected".

In a further case, the form of the Integrity Report could provide an indication of "no anomaly detected" or "anomalous".

In a further case, the form of the Integrity Report could provide an indication of "no anomaly detected", "anomalous" or "highly anomalous".

In a further case, the form of the Integrity Report could provide an indication of "all monitored characteristics: within expected operational bounds", "one or more monitored characteristics: outside expected operational bounds" or "one or more monitored characteristics: well outside expected operational bounds".

In further cases, other or similar variations to the above may be provided. Further, more granular breakdowns, with indications of different types of anomalies found in the V2X transmitter are possible.

Many of the potential anomalies found may be Boolean (true or not true), so either there is an anomaly or there is not. Some anomalies may also be non-binary. For example, in one case the operational bound of expected network data throughput is less than a value "X". Then 'anomalous' could correspond to a throughput being measured of between values "X" and "Y", and 'highly anomalous' could be a throughput measured that is greater than value "Y". Other examples are possible.

Further, the Integrity Report may also be sent to a function that is provisioned in a vehicle to help diagnostics or analysis after an event has occurred with the vehicle, for example with a post-crash analysis of the vehicle. Such a function may be referred to as a "black box" or "event data recorder". Such an Integrity Report may optionally provide more detailed information than that which is included in a V2X message. For example, the Integrity Report may provide more specifics on the type of anomaly detected and may indicate the ECU(s) on which the anomaly was detected, as well as software and hardware bill of material and version numbering in one case. Such an Integrity Report containing more detailed information may be sent to a server outside of the vehicle, for example an anomaly detection server, a cloud-based server, among other options.

Thus, based on the V2X message composed at block 430, the process may proceed to block 440 in which the V2X message is sent if permitted by the contents of the Integrity Report.

From block 440, the process may proceed back to block 430 to compose another V2X message. However, if a trigger for the performance of the integrity detection is received, then the process may proceed to block 420 to perform a further integrity detection.

When sending the message at block 440, an Auditing CA may provide assurance that the integrity detection solution or function is secure or cybersecure to a specific level. This is done to ensure that reports provided by the integrity detection function can be trusted as being both accurate and also authentically produced by a function within the V2X transmitter. The assurance indication is provided within the Authorization Ticket/Certificate that is signed by the Application CA and ultimately the Root CA of the CCMS/SCMS. As used herein, an Application CA issues certificates that can be used for short periods, during certain validity intervals, associated with certain applications and with a pseudonymous identity. This entity was previously referred to as a Pseudonym Certificate Authority.

The ETSI (CCMS) Authorization Authority performs similar functionality. Various measures may be taken to minimize the chance that the integrity detection function itself has not been compromised, or is very difficult to compromise.

In one aspect, such measures may include running the Integrity Detection application in secure hardware (for example a TrustZone for Advanced Reduced Instruction Set Computer (RISC) Machine (ARM) processors or similar). In such a system, a rich operating environment or system is run in the less trusted area, with a smaller security-specialized code running in the more trusted area. This may reduce the attack surface of the Integrity Detection application and other secured applications. This simultaneous support for a rich operating environment and trusted operating environment could be achieved using a virtualization technology running on a single core.

In a further aspect, such measures may include a secure boot chain process using a root of trust key that is embedded in the hardware. A secure boot chain process may be used, where a Boot ROM signature is checked, then an OS software signature is checked, then one or more application signatures are checked (for example an integrity detection application signature).

In a further aspect, such measures may include that the Integrity Report is signed using a private key that may, for example, be installed within secure hardware. A V2X receiver can verify the authenticity of the Integrity Report using a corresponding Public Key. An example implementation by which the signing may occur is provided with regards to FIG. 5 below.

In a further aspect, such measures may include that the integrity detection function itself is patchable and is patched when patches are available. In this case, one possible assumption is that the Audit CA provides assurance that the original design is good and that there are patching mechanisms in place, but the Audit CA does not re-evaluate the system every time there is an update to the integrity detection software. The assumption would also be that the original assurance also provides confidence for the V2X receiver that the integrity detection software which is running will indeed be the most up to date version.

Another possible assumption is that vehicles that have not updated their integrity detection software in a timely manner may have their certificates revoked, for example using a Certificate Revocation List.

Figure 5:
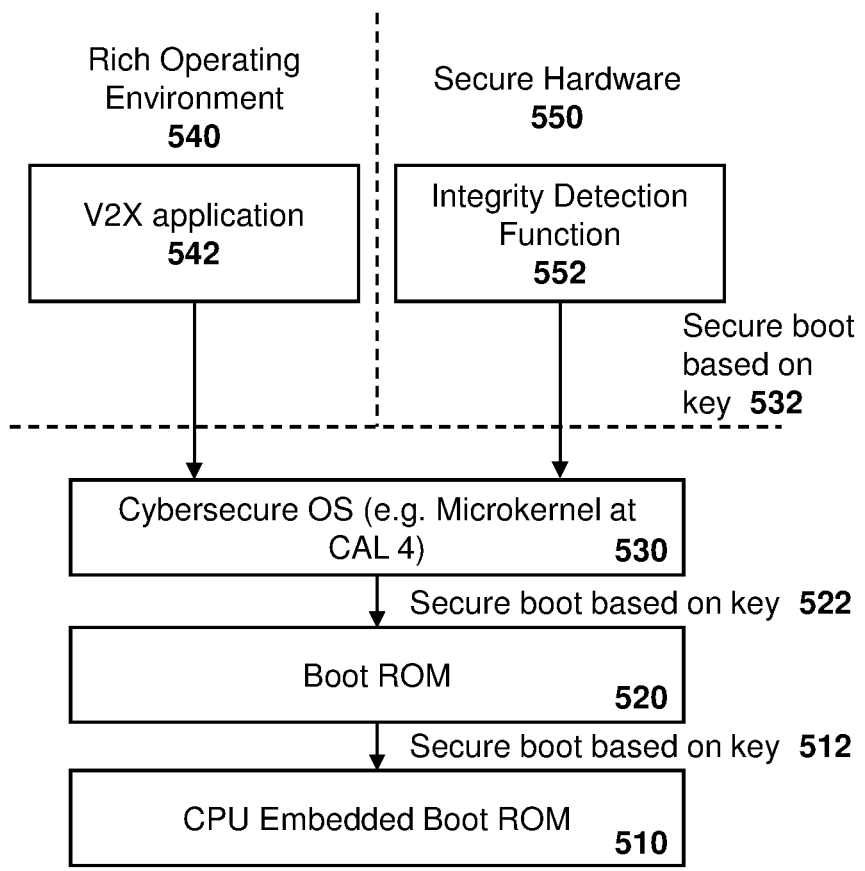
FIG. 5 is a block diagram of an example Integrity Detection function implemented in secure hardware at a V2X entity.

Reference is now made to FIG. 5, which shows an example implementation of an Integrity Detection Function within an ITS-S. In the example of FIG. 5, a Central Processing Unit (CPU) embedded Boot ROM 510 may securely boot, based on a key 512, the Boot ROM 520. Boot ROM 520 may securely boot, based on a key 522, a Cybersecure Operating System (OS) 530 such as a microkernel deemed to be a particular Cybersecurity Assurance Level (CAL), for example CAL4.

Cybersecure OS 530 may securely boot, based on key 532, a Rich Operating Environment 540. Rich Operating Environment 540 may include a V2X application 542.

Cybersecure OS 530 may further securely boot, based on key 532, secure hardware 550. Secure hardware 550 may contain the Integrity Detection Function 552.

One benefit of having the Integrity Detection Function 552 provided on a secure hardware 550 is that it makes it more difficult for an attacker to compromise or hack the Integrity Detection Function compared to if the Integrity Detection Function was provided in the Rich Operating Environment 540.

Figure 6:
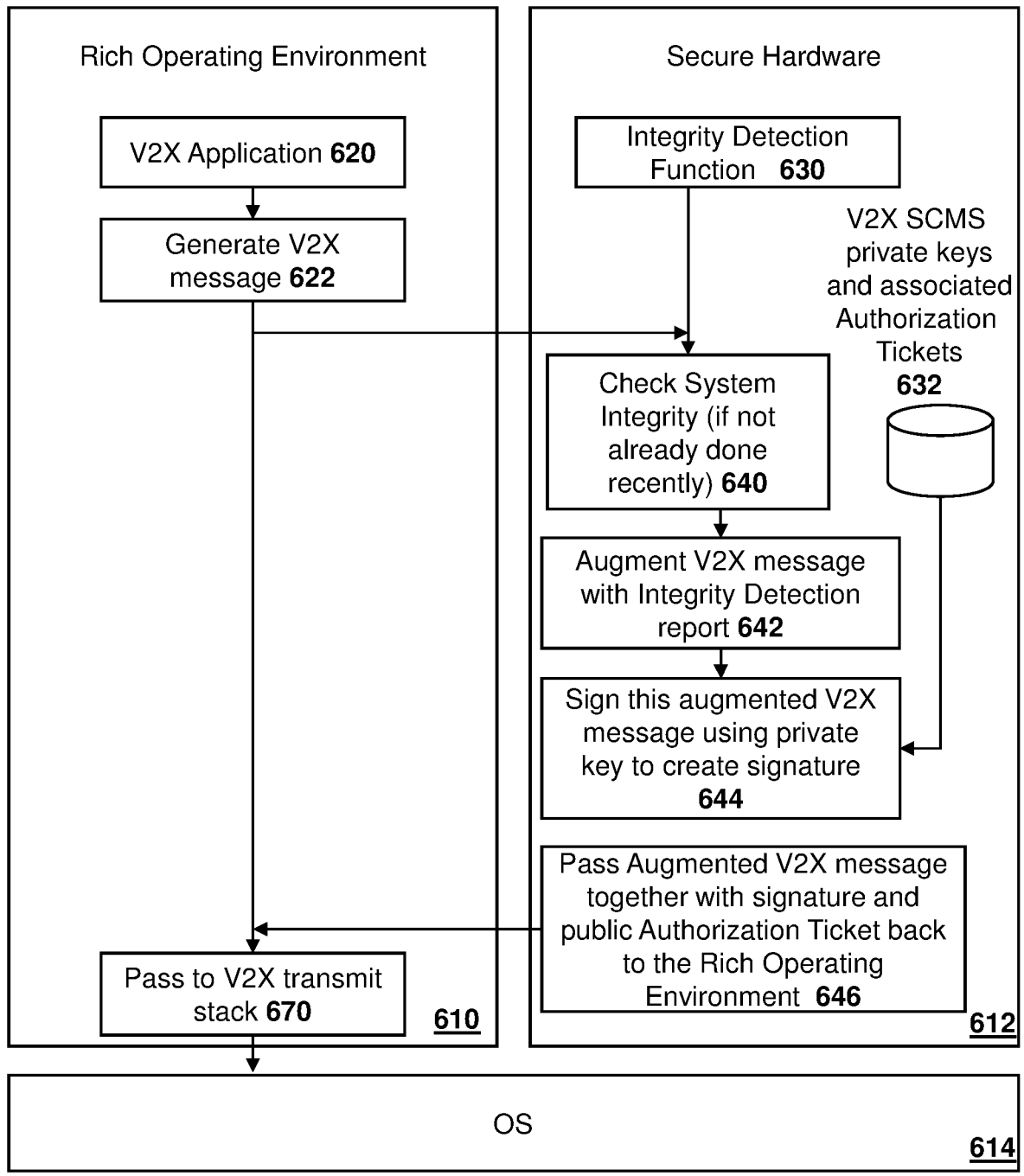
FIG. 6 is a block diagram showing interaction between a V2X application that is implemented in a rich operating environment and an Integrity Detection function implemented in secure hardware.

An example interaction between an Integrity Detection Function and V2X client/application within an ITS-S is provided with regards to FIG. 6. In particular, the environment of FIG. 6 includes a Rich Operating Environment 610, a Secure Hardware area 612 and an Operating System 614.

The Rich Operating Environment 610 includes a V2X application 620 which may generate a V2X message as shown at block 622.

Secure hardware area 612 includes an Integrity Detection Function 630 in the embodiment of FIG. 6. However, the example of FIG. 6 is merely one solution and in another case the Integrity Detection Function may be outside of a secure hardware area.

After the V2X message is generated at block 622, it is sent to the Integrity Detection Function 630. The Integrity Detection Function 630 may then check the system integrity at block 640, for example using the methods described above with regards to block 420 of FIG. 4. The checking of system integrity may also optionally involve querying other electronic control units (ECUs) to determine whether those ECUs have experienced any anomalies. Such ECUs may be sensor or actuator ECUs that are providing information that is being used in providing the content of the V2X message, for example.

At block 642, the V2X message may be augmented with an Integrity Report.

At block 644, the V2X message with the Integrity Report may be signed using a private key that may be installed within the secure hardware 612, for example in area 632. This key can be verified by a V2X receiver using a corresponding public key to verify the authenticity of the Integrity Report.

For example, in one case the Integrity Detection Function 630 adds an Integrity Report to the V2X message, and the augmented V2X message is signed using the private key that is associated with the Authorization Ticket/Certificate, and this signature and the Authorization Ticket/Certificate is added to the augmented V2X message. As indicated above, the Authorization Ticket/Certificate may include information from an Audit CA regarding the integrity detection function.

The signed, augmented V2X message is then provided back to the Rich Operating Environment 610 at block 646 for the message to be transmitted on the V2X communication stack at block 670.

In order to prevent the V2X application from replaying an old message and attaching an old integrity detection report, various techniques may be used. In one technique, time varying information, such as a timestamp, nonce or count, is included in the V2X message which is passed from the Rich Operating Environment 610 to the Secure Hardware area 612. In some cases, the V2X message may include a timestamp anyway, since a timestamp is often a critical piece of information for the V2X receiver application, for reasons that are unrelated to cybersecurity, as outlined in the Society of Automotive Engineers (SAE) J2735. In this case, if the granularity of the timestamp is, for example, in 10 millisecond increments then any replay sent out within the same second will succeed because the replay cannot be distinguished. However, a sequence number or message count, along with the timestamp may overcome this. In this case, the count may need a high-enough rollover to occur outside the granularity of the timestamp.

Similarly, a message count is included in many V2X messages, as defined in SAE J2735. This message count may be important in applications that need to know whether messages have gone missing.

In another case, a nonce, message count or timestamp may be inserted by the Integrity Detection Function 630 within the Secure Hardware area 612, and is included in the integrity detection report.

With all of the above, the V2X receiver may need to keep track of these values (for example a nonce, message count, or time stamp) to detect replay.

The augmented V2X message further includes an Authorization Ticket/Certificate that has an indication indicating that the Integrity Detection function is secure. Such indication may be within in an existing field, or in a new field. Further, the security of the Integrity Detection Function 630 can be more secure than the V2X application 620.

This indication/assurance might originally come from an Auditing CA that has inspected manufacturer processes and documentation for compliance against secure development lifecycle standards and/or for compliance against a product standard. In one example, this assurance information would be provided to the Enrolment Authority. The Enrolment Authority would then provide this information to the Authorization Authority as part of the process by which the ITS-S gets issued with Authorization Tickets. For example, this may be part of message 230 in FIG. 2.

In this way, only ITS stations for which the Integrity Detection Function is assured as being highly secure would receive Authorization Tickets/Certificates with a field indicating that Integrity Reports can be trusted by a V2X receiver set.

Integrity Detection Compromise

Although many mechanisms may be put in place both during design, and process-wise, in order to ensure that the cybersecurity reporting can be relied upon, it is nevertheless possible that a hacker/attacker could compromise the function within the V2X transmitter that produces Integrity Reports.

When such a compromise is detected, then the SCMS CA can be notified and one or more certificates for affected V2X transmitters, possibly including those that share the same hardware/software as that which has been compromised, can be revoked for example by adding, or sending a message to request to be added, the one or more certificates one or more indications of the certificates to a Certificate Revocation List (CRL).

Figure 7:
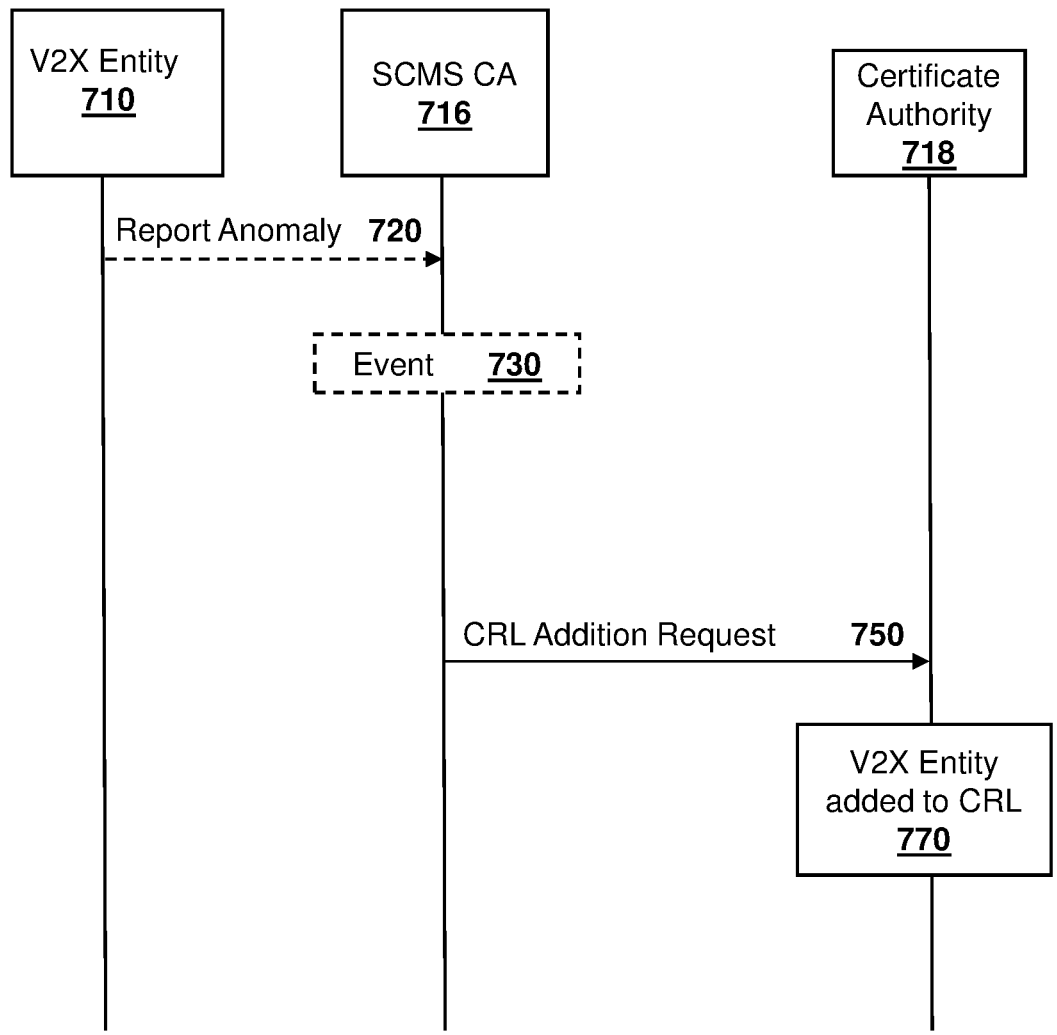
FIG. 7 is a dataflow diagram showing the addition of a V2X entity onto a certificate revocation list.

The SCMS CA sending a message to request one or more certificates or one or more indications of the certificates to a Certificate Revocation List (CRL) is shown with regards to FIG. 7. In the embodiment of FIG. 7, a V2X entity 710 may include one or more certificates to sign Integrity Reports. The SCMS CA 716 may provide such one or more certificates to the V2X entity 710.

In the embodiment of FIG. 7, the V2X entity may optionally report an anomaly, as shown by message 720, to the SCMS CA 716.

In a separate option, an event shown at block 730 may occur. For example, the event may be a traffic accident that is analyzed and the breach of the Integrity Report is discovered. Other events at block 730 are possible.

Based on either the receiving of message 720 or the event 730 occurring, the SCMS CA 716 may send a CRL Addition Request message 750 to Certificate Authority 718, where the message 750 contains one or more certificates or one more indications of certificates. In one case, message 750 may also include information relating to the vehicle for example the make of the vehicle, the model of the vehicle, amongst other options. Other options are possible.

On receiving message 750, the Certificate Authority 718 may add the received one or more certificates or one more indications of certificates to a CRL, as shown at block 770. Such CRL may then be distributed to ITS stations.

Thereafter, when affected V2X transmitters that have had one or more of their certificates revoked contact the SCMS CA 716 to obtain one or more new certificates, they can either not be issued with new certificates or could be issued with one or more certificates with a lower Integrity Detection Assurance Level.

It is possible for a single organization (OEM) to both keep track of whether a certain type of car/V2X transmitter design has compromised integrity detection (or cybersecurity posture) reporting and place one or more certificates, or indications of one or more certificates, of the affected vehicles on a CRL. This may be possible in a scenario where same entity or organization that owns the CRL also has access to the integrity detection (or cybersecurity posture) information for example where a vehicle OEM operates the SCMS.

Further, by placing one or more certificates, or indications of one or more certificates, of an affected a vehicle on a CRL, this may prompt the vehicle to request one or more new certificates once such vehicles discover one or more of their certificates are present or indicated on the CRL.

Further, in some cases a different intermediate certificate authority may be used for a group of vehicles, for example a CA for each make/model/year or "V2X-module HW generation". By using a different Intermediate CA for a group of vehicles, revoking an Intermediate CA certificate may be a simpler and more scalable alternative to revoking individual vehicles by one or more of their certificates.

A vehicle OEM operated SCMS might be achieved by mapping or binding together both the V2X transmitter type within a vehicle (software/hardware used) and a pseudonym certificate for that vehicle. This could be achieved by utilizing a look-up list or table, performing a database lookup, amongst other options. The pseudonym certificate can later be provided to the SCMS misbehavior authority in a misbehavior report (or similar) to cause one or more certificates associated with that vehicle to be placed on a CRL.

The process by which the vehicle's relevant public key is securely transmitted to the Authorization CA as well as the process of assuring the receiving car has a trusted copy of the Authorization CA's public key may follow currently defined mechanisms.

Further, it is possible that not all V2X transmitters would implement the processes and mechanisms provided in FIGS. 4 to 7 above, but rather that some would continue to operate as currently defined, without inclusion of an Integrity Report, and without modifications to certificate formats. To support this paradigm, V2X receivers would need to determine the type of V2X transmitter, which they could do, for example, by inspecting a certificate within a received V2X message to see whether an integrity detection assurance level is included (or whether the certificate is of a type that could include such an integrity detection assurance level). If the V2X transmitter is determined to be one that does not use or support or implement this feature, then the V2X receiver could process the received V2X message and the certificate according to current methods.

Therefore, based on the embodiments of FIGS. 4 to 7, with the Integrity Report and the Auditing CA information in received V2X messages, the V2X receiver can be assured that: the integrity detection engine provides confirmation as to whether or not the integrity of the V2X transmitter is intact (for example no anomalies have been detected, checks for new software patches have been performed and acted upon recently, among other checks); and the report of the integrity detection function can be trusted because the associated design and processes for integrity detection report production have been assured to be trustworthy to a very high level by an independent Auditing CA.

Further, while it is possible that the process described in the embodiments of FIGS. 4 to 7 would completely replace the conventional misbehavior authority scheme currently in use, it is also possible that both schemes could be used in parallel.

Receiving V2X Messages

A V2X receiver ITS-S could be provisioned/pre-programmed with a set of various actions that may be taken based on the contents of a received Integrity Report (for example based on the included cybersecurity posture level). The exact behavioral options will be dependent on the use case, and an example is given below. However, the V2X receiver may exercise more caution as the trust level decreases.

Figure 8:
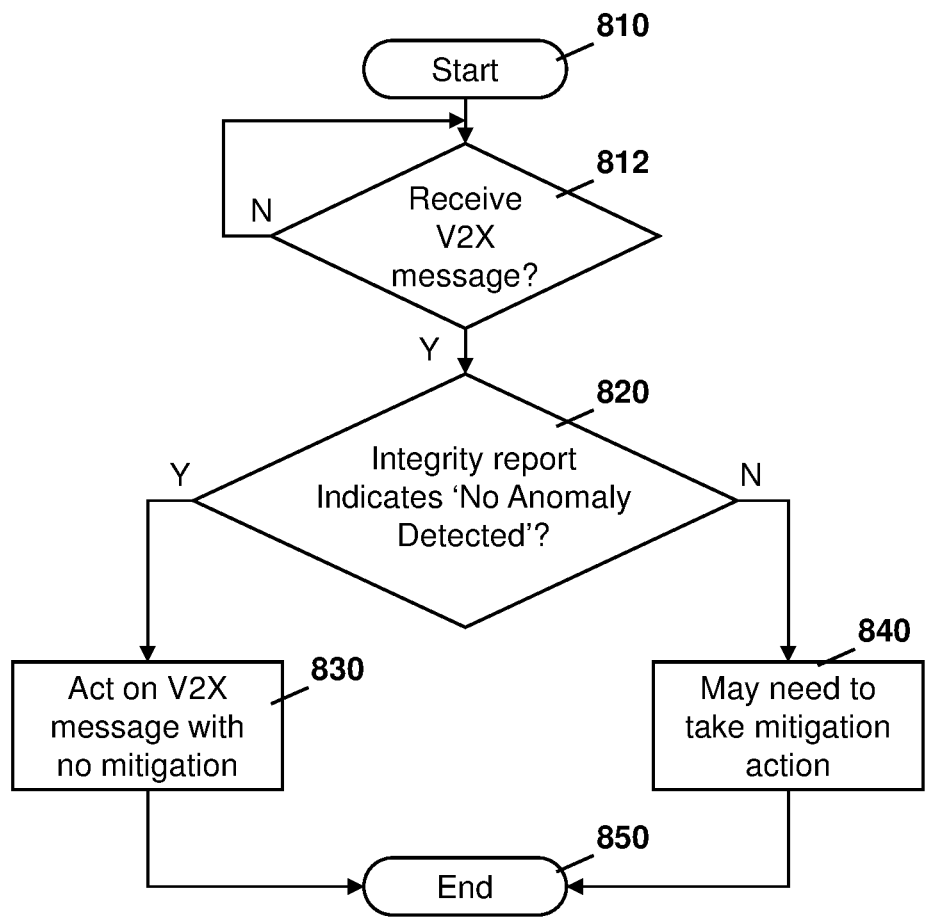
FIG. 8 is a process diagram showing a process at a receiving V2X entity for determining whether mitigation action is needed when acting on a received V2X message.

One example of a process for a receiving V2X Entity is shown with regards to FIG. 8. The process of FIG. 8 starts at block 810 and proceeds to block 812 in which the ITS-S Receiving Entity determines whether a V2X message has been received. If not, the process continues to loop to block 812 until a V2X message is received.

Once a V2X message is received, the process proceeds to block 820 in which a check is made to determine whether the Integrity Report indicates "no anomaly detected" or other similar condition. Such check could also include checking that the integrity detection function is certified by an Audit CA, as described above.

If yes, the process proceeds from block 820 to block 830 in which the receiving V2X application can act on the V2X message contents without having to take any resulting mitigating action, at least from a cybersecurity perspective.

For example, if the V2X application is an Emergency Brake Warning application, then at block 830 there is trust in the message contents and brakes can be applied hard, even if this potentially could risk other, less serious accidents than would be the case if the brakes were not applied hard.

Conversely, if the check at block 820 determines that the Integrity Report for the V2X transmitter is missing or indicates that anomalies have been detected, then the process proceeds to block 840 and the ITS-S Receiving Entity can take mitigating action.

For example, in the case of the Emergency Brake Warning application, there will be less trust in the message contents at block 840 than there would have been at block 830. In this case, brakes may still be applied more softly, pending further corroborating evidence such as visual evidence that a vehicle ahead has applied its brakes in an emergency manner.

In some cases, if the anomaly is not Boolean, but has various levels, then the higher the anomaly level, the more cautious the receiving entity may be in its reaction to the message, and hence the degree of reaction that can be made to the message may be lessened. For example, if there is a large difference between these two levels, then the vehicle may not apply any braking, but may instead pre-charge the brakes. For example, this may involve priming the hydraulic system and enabling augmentation of the force and speed with which the brakes are applied if and when a human driver or an autonomous robot does apply the brakes. Other options are possible.

From block 830 or block 840, the process proceeds to block 850 and ends.

Updates To Messaging

Policy and governance documents, such as the European Commission, '*Certificate policy for deployment and operation of European Cooperative Intelligent Transport Systems (C-ITS)*', Release 1, June 2017, could be updated to define new requirements to be performed by a Certificate Authority. Added requirements may include: that the SCMS CA may determine that there is evidence from independent $3^{rd}$ party(s) (i.e. from an Audit CA) that an OEM's stated assurance levels for the integrity detection function associated with a given canonical identity have in fact been achieved.

In some cases, the cybersecurity 'quality' (level) of the Integrity Detection software might be determined according to the requirements of a Common Criteria protection profile and might potentially have Evaluation Assurance Level (EAL) levels associated with it.

Equally, a V2X industry association or standards body might define their own rankings, as has happened with the use of Trust Assurance Level (TAL) defined by Car2Car consortium and ETSI. Yet another alternative could be to use a Cybersecurity Assurance Level (CAL), for example as defined in ISO 21434.

Various messages and entities may need to be updated, including the Enrolment Authority, Authorization ValidationResponse message and AuthorizationValidationRequest message, and/or Authorization Ticket/Certificate, among others.

The Authorisation ValidationResponse and AuthorizationValidationRequest messages may updated to include, alongside the current assuranceLevel parameter, a new parameter, labelled herein as intDetectAssuranceLevel. This new parameter indicates the assurance level that is associated with the integrity detection function.

Specifically, the CertificateSubjectAttributes structure used in both messages may be updated as shown in bold in Table 3 below. This structure is the type associated with both requestedSubjectAttributes (AuthorizationValidationRequest message) and confrmedSubjectAttributes (Authorization ValidationResponse) message.

TABLE 3

| CertificateSubjectAttributes |
| --- |
| CertificateSubjectAttributes ::= SEQUENCE {<br>   id                              CertificateId OPTIONAL,<br>   validityPeriod             ValidityPeriod OPTIONAL,<br>   region                        GeographicRegion OPTIONAL,<br>   intDetectAssuranceLevel SubjectIntDetectAssurance OPTIONAL,<br>   assuranceLevel            SubjectAssurance OPTIONAL,<br>   appPermissions            SequenceOfPsidSsp OPTIONAL,<br>   certIssuePermissions SequenceOfPsidGroupPermissions OPTIONAL,<br>   ...<br>}(WITH COMPONENTS { ..., appPermissions PRESENT} \|<br>WITH COMPONENTS { ..., certIssuePermissions PRESENT}) |

Further, with regards to the Authorization Ticket/Certificate, The AuthorizationResponse message that is sent from the Authorization Authority to ITS-S and which includes Authorization Tickets, may update the Authorization Tickets to include, alongside the current assuranceLevel parameter the new parameter intDetectAssuranceLevel For example, Table 4 shows a current Authorization Ticket as defined in IEEE 1609.2.

TABLE 4

| Authorization Ticket |
| --- |
| ToBeSignedCertificate ::= SEQUENCE {<br>   id                              CertificateId,<br>   cracaId                       HashedId3,<br>   crlSeries                    CrlSeries,<br>   validityPeriod             ValidityPeriod,<br>   region                        GeographicRegion OPTIONAL,<br>   assuranceLevel            SubjectAssurance OPTIONAL,<br>   appPermissions            SequenceOfPsidSsp OPTIONAL,<br>   certIssuePermissions     SequenceOfPsidGroupPermissions OPTIONAL,<br>   certRequestPermissions SequenceOfPsidGroupPermissions OPTIONAL,<br>   canRequestRollover     NULL OPTIONAL,<br>   encryptionKey             PublicEncryptionKey OPTIONAL,<br>   verifyKeyIndicator     VerificationKeyIndicator,<br>   ...<br>}<br>(WITH COMPONENTS { ..., appPermissions PRESENT} \|<br>WITH COMPONENTS { ..., certIssuePermissions PRESENT} \|<br>WITH COMPONENTS { ..., certRequestPermissions PRESENT}) |

In one embodiment, the Authorization Ticket could be modified as shown in bold in accordance with Table 5 below

TABLE 5

Modified Authorization Ticket

```
ToBeSignedCertificate ::= SEQUENCE {
    id                      CertificateId,
    cracaId                 HashedId3,
    crlSeries               CrlSeries,
    validityPeriod          ValidityPeriod,
    region                  GeographicRegion OPTIONAL,
    assuranceLevel          SubjectAssurance OPTIONAL,
    intDetectAssuranceLevel SubjectIntDetectAssurance OPTIONAL,
    appPermissions          SequenceOfPsidSsp OPTIONAL,
    certIssuePermissions         SequenceOfPsidGroupPermissions OPTIONAL,
    certRequestPermissions  SequenceOfPsidGroupPermissions OPTIONAL,
    canRequestRollover           NULL OPTIONAL,
    encryptionKey           PublicEncryptionKey OPTIONAL,
    verifyKeyIndicator      VerificationKeyIndicator,
    ...
}
(WITH COMPONENTS { ..., appPermissions PRESENT} |
 WITH COMPONENTS { ..., certIssuePermissions PRESENT} |
 WITH COMPONENTS { ..., certRequestPermissions PRESENT})
```

SubjectIntDetectAssurance could, for example, take one of 7 levels. These may correspond to common criteria EAL 1 through 7. Alternatively, the levels could take equivalent values of TAL, or CAL. In other cases, more or fewer levels could be used.

Further, in some cases SubjectIntDetectAssurance could be defined as essentially a binary: e.g. 'integrity detection reports are trustworthy', 'integrity detection reports may not be trustworthy'.

In another case, if the information element is present then it means that integrity detection reports can be trusted and the V2X transmitter based misbehavior approach in accordance with the embodiments herein can be relied upon, whilst if it is absent then the V2X receiver may fall back on relying on the conventional Misbehavior Authority (which may involve a CRL) approach.

The existing assuranceLevel information may then become associated with the V2X application that is operating in the rich operating environment.

Peer to Peer Cybersecurity Posture Reporting

In a variant to the embodiments of FIGS. 4 to 7 above, rather than the solution being designed around actually detecting and optionally reporting misbehavior, the transmitting vehicle may instead or in addition determine and report other aspects of cybersecurity posture that could be used by the V2X receiver in determining what degree of trust to place in the received message. Such misbehavior could include detecting anomalies, detecting actual malicious activity, among other such behaviors.

Other aspects of cybersecurity posture that could be reported could include various items.

One item may include an aggregated (and possibly quantized) Cybersecurity Vulnerability Scoring System (CVSS) score for that V2X transmitter. Here, the CVSS is a standardized Cybersecurity Vulnerability Scoring System and an aggregated metric may be determined by considering all or a subset of known vulnerabilities for that V2X transmitter and aggregating the respective CVSS scores over those vulnerabilities.

Another item may include whether software in a V2X transmitter such as a V2X application which may reside in a rich operating environment, an Integrity Detection function which may reside in a secure hardware, among others, is considered up to date.

Another item may include when the software update server was last visited/polled to determine whether new software/patches are available. Such software or patches may, for example, be for the V2X application software, for the integrity detection function, among others.

Another item may include whether an exploit or vulnerability is known to have occurred for the V2X transmitter. This vulnerability may be for specific hardware versions, software versions, among other considerations. Such item may also include the severity of known exploit(s), for example as measured by CVSS.

Another item may include whether a patch for known exploits is available yet.

As per the embodiments of FIGS. 4 to 7, the report may include other aspects to secure the report, such as a timestamp so that it cannot be replayed.

Figure 9:
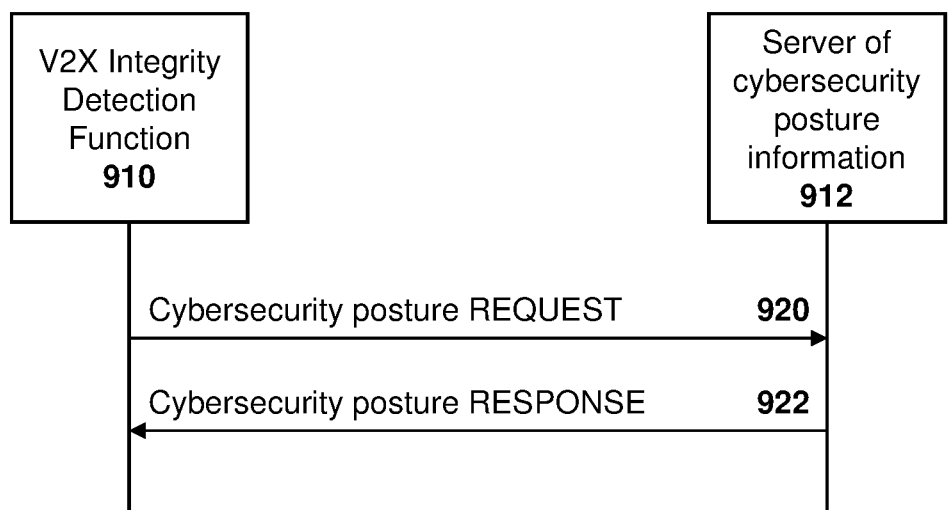
FIG. 9 is a dataflow diagram showing a message sequence for requesting cybersecurity posture.

An ITS-S may need to poll an entity such as an OEM server, or federated vulnerability disclosure database/server, in order to obtain the cybersecurity posture information described above. In this case, the polling may occur from within software loaded into the secure hardware. Reference is now made to FIG. 9.

In the embodiment of FIG. 9, a V2X integrity detection function 910 may communicate with a server of cybersecurity posture information 912. In this case, the V2X integrity detection function 910 may send a cybersecurity posture request 920 to the server 912.

In response, server 912 may send a cybersecurity posture response 922 back to the V2X integrity detection function 910.

Therefore, based on FIG. 9, peer to peer cybersecurity posture reporting may be performed.

Hardware

A V2X Entity, V2X Client, ITS-S, Enrollment Authority, Authorization Authority, SCMS, Certificate Authority, or a network server or node may be any type of computing device. For example, one simplified computing device that may perform the embodiments described above is provided with regards to FIG. 10.

Figure 10:
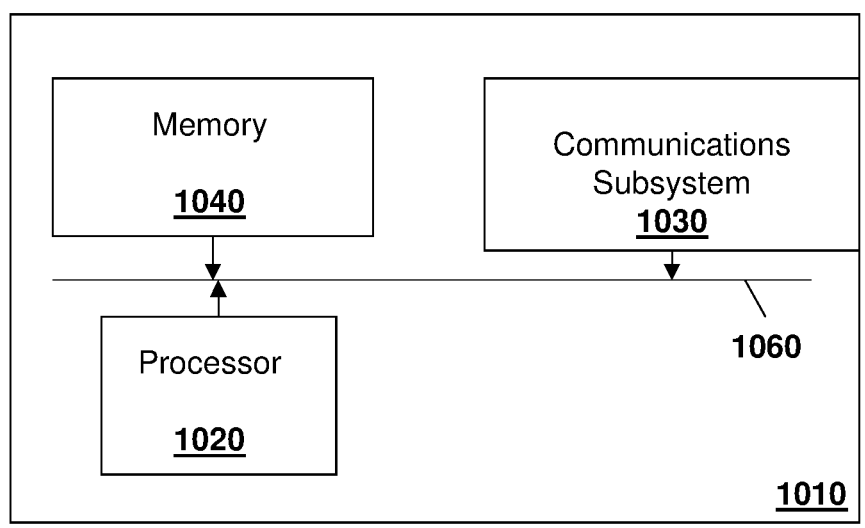
FIG. 10 is a block diagram of an example computing device or server capable of being used with the embodiments of the present disclosure.

In FIG. 10, computing device 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the computing device 1010, and is shown in the example of FIG. 10 as memory 1040. The memory 1040 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1040, the computing device 1010 may access data or programmable logic from an external storage medium, for example through the communications subsystem 1030.

The communications subsystem 1030 allows the computing device 1010 to communicate with other devices or network elements.

Communications between the various elements of the computing device 1010 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

Further, exemplary clauses may provide a method at an Intelligent Transportation System (ITS) Receiving Entity, the method comprising: receiving an ITS message; determining that the received ITS message is signed using a certificate from a recognized certificate authority; determining that assurance indication from an Audit Certificate Authority for the integrity detection function exists within the ITS message; extracting an Integrity Report from the ITS message; and acting on the ITS message based on results within the Integrity report.

The invention claimed is:

1. A method at an Intelligent Transportation System (ITS) Transmitting Entity, the method comprising:
   generating an ITS message at the ITS Transmitting Entity;
   augmenting the ITS message with an Integrity Report generated by an integrity detection function internally within the ITS Transmitting Entity to create an augmented ITS message, the integrity detection function checking a cybersecurity posture of a transmitter of the ITS transmitting entity, wherein the Integrity Report is generated by performing, by the integrity detection function at the ITS transmitting entity, an integrity check of ITS Transmitting Entity;

signing the augmented ITS message with an Authorization Certificate or Ticket, the Authorization Certificate or Ticket including an assurance indication from an Audit Certificate Authority for the integrity detection function; and sending the signed, augmented ITS message to an ITS Receiving Entity.

2. The method of claim 1, wherein the generating the ITS message is performed in a rich operating environment of the ITS Transmitting Entity.

3. The method of claim 1, wherein the integrity detection function is within a secure element of the ITS Transmitting Entity.

4. The method of claim 1, wherein the performing is based on a trigger condition, the trigger condition being one or more of: on device or Operating System boot up; whenever an application is booted or loaded; periodically; upon firmware or software update completion; upon detection of new hardware; upon detection of a new or updated application; and whenever a new ITS message is to be sent.

5. The method of claim 1, wherein the performing detects anomalies in the ITS Transmitter, the detecting including one or more of: detection of security policy violations; detection of memory violations; detection of networking anomalies; detection of process anomalies; task manager anomalies; crash detection; integrity check of one or more of hardware, software, boot read only memory (ROM), operating system, and applications; and detection of hardware security module tampering.

6. The method of claim 1, further comprising the Integrity Report indicating an anomaly was detected by at least one of: sending a message to an application; sending a message to an On-Board Unit (OBU) or Electronic Control Unit (ECU); sending a message to a server outside a vehicle; causing a visual alert on a display unit; causing an audible alert.

7. The method of claim 1, wherein the Integrity Report is Boolean indicating whether an anomaly was detected.

8. The method of claim 1, wherein the Integrity Report includes a level of an anomaly detected.

9. The method of claim 1, wherein the assurance indication from the Audit Certificate Authority is within a field of the Authorization Certificate or Ticket.

10. An Intelligent Transportation System (ITS) Transmitting Entity, the ITS Transmitting Entity comprising:
a processor;
a memory; and
a communications subsystem,
wherein the memory storing instructions when executed by the processor cause the ITS Transmitting Entity to:
generate, using the processor, an ITS message at the ITS Transmitting Entity;
augment, using the processor, the ITS message with an Integrity Report generated by an integrity detection function internally within the ITS Transmitting Entity to create an augmented ITS message, the integrity detection function checking a cybersecurity posture of a transmitter of the ITS transmitting entity, wherein the Integrity Report is generated by performing, by the integrity detection function at the ITS transmitting entity, an integrity check of ITS Transmitting Entity;
sign, using the processor, the augmented ITS message with an Authorization Certificate or Ticket, the Authorization Certificate or Ticket including an assurance indication from an Audit Certificate Authority for the integrity detection function; and
send, using the communications subsystem, the signed, augmented ITS message to an ITS Receiving Entity.

11. The ITS Transmitting Entity of claim 10, wherein the ITS Transmitting Entity is configured to generate the ITS message in a rich operating environment of the ITS Transmitting Entity.

12. The ITS Transmitting Entity of claim 10, wherein the integrity detection function is within a secure element of the ITS Transmitting Entity.

13. The ITS Transmitting Entity of claim 10, wherein the ITS Transmitting Entity is configured to perform based on a trigger condition, the trigger condition being one or more of: on device or Operating System boot up; whenever an application is booted or loaded; periodically; upon firmware or software update completion; upon detection of new hardware; upon detection of a new or updated application; and whenever a new ITS message is to be sent.

14. The ITS Transmitting Entity of claim 10, wherein the ITS Transmitting Entity is configured to perform detecting anomalies in the ITS Transmitter, the detecting including one or more of: detection of security policy violations; detection of memory violations; detection of networking anomalies; detection of process anomalies; task manager anomalies; crash detection; integrity check of one or more of hardware, software, boot read only memory (ROM), operating system, and applications; and detection of hardware security module tampering.

15. The ITS Transmitting Entity of claim 10, wherein the Integrity Report indicates an anomaly was detected by at least one of: sending a message to an application; sending a message to an On-Board Unit (OBU) or Electronic Control Unit (ECU); sending a message to a server outside a vehicle; causing a visual alert on a display unit; causing an audible alert.

16. The ITS Transmitting Entity of claim 10, wherein the Integrity Report is Boolean indicating whether an anomaly was detected.

17. The ITS Transmitting Entity of claim 10, wherein the Integrity Report includes a level of an anomaly detected.

18. The ITS Transmitting Entity of claim 10, wherein the assurance indication from the Audit Certificate Authority is within a field of the Authorization Certificate or Ticket.

19. A non-transitory computer readable medium for storing instruction code which, when executed by a processor of an Intelligent Transportation System (ITS) Transmitting Entity cause the ITS Transmitting Entity to:
generate an ITS message at the ITS Transmitting Entity;
augment the ITS message with an Integrity Report generated by an integrity detection function internally within the ITS Transmitting Entity to create an augmented ITS message, the integrity detection function checking a cybersecurity posture of a transmitter of the ITS transmitting entity, wherein the Integrity Report is generated by performing, by the integrity detection function at the ITS transmitting entity, an integrity check of ITS Transmitting Entity;
sign the augmented ITS message with an Authorization Certificate or Ticket, the Authorization Certificate or Ticket including an assurance indication from an Audit Certificate Authority for the integrity detection function; and send the signed, augmented ITS message to an ITS Receiving Entity.

\* \* \* \* \*